(12) United States Patent
Gupta et al.

(10) Patent No.: US 7,188,962 B2
(45) Date of Patent: Mar. 13, 2007

(54) LIGHT MODULATOR DEVICE

(75) Inventors: Anurag Gupta, Corvallis, OR (US); Scott Lerner, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/101,678

(22) Filed: Apr. 8, 2005

(65) Prior Publication Data

US 2006/0227400 A1 Oct. 12, 2006

(51) Int. Cl.
*G02B 27/00* (2006.01)
(52) U.S. Cl. ............... 359/613; 359/619; 359/668; 359/669; 353/70; 348/834
(58) Field of Classification Search ............... 359/613, 359/668, 669, 619; 353/32, 33, 70, 81; 348/834
See application file for complete search history.

(56) References Cited

U.S. PATENT DOCUMENTS

| 4,526,470 | A | | 7/1985 | Kaye |
| 5,251,322 | A | | 10/1993 | Doyle et al. |
| 5,349,398 | A | | 9/1994 | Koester |
| 5,621,487 | A | * | 4/1997 | Shirochi ............... 349/112 |
| 6,373,537 | B2 | * | 4/2002 | Yun et al. ............... 349/58 |
| 6,485,625 | B1 | | 11/2002 | Simpson et al. |
| 2003/0184843 | A1 | | 10/2003 | Moon et al. |
| 2004/0218401 | A1 | | 11/2004 | Okubo et al. |

* cited by examiner

*Primary Examiner*—Hung Xuan Dang
*Assistant Examiner*—Joseph Martinez

(57) ABSTRACT

A light modulator device includes a top plate and an angled extender coupled to the top plate. The angled extender includes an incident portion and an exit portion that is relatively thicker than the incident portion.

22 Claims, 8 Drawing Sheets

LIGHT MODULATOR DEVICE

BACKGROUND

Micro-electromechanical systems (MEMS) are used in a variety of applications, including optical display systems. In many optical display systems, arrays of MEMS devices commonly referred to as pixels are electromechanically controlled to reflect image-carrying modulated light toward display optics for display. As a light source projects light rays onto the pixels, the pixels reflect modulated light rays carrying image data toward the display optics. The pixels may be electromechanically controlled to regulate the characteristics of the modulated light. For example, some pixels include spatial gaps that are controlled to determine the characteristics of the modulated light. For example, the spatial gap may be set to a distance that limits the reflected modulated light to a particular range of wavelengths.

As light rays from the light source reach the pixels, a certain amount of the light rays reflects off of the surfaces of the pixels and mixes with the modulated light. For example, some types of pixels have a partially reflective top plate. The surface of the top plate of such a pixel will reflect a portion of the light rays away from the pixel. Light that reflects off of pixel surfaces is commonly referred to as stray light. If the amount of stray light that mixes with the modulated light is high, the resulting display images will have poor contrast.

Stray light can also be introduced by other surfaces of optical display systems. In particular, any surface positioned between the light source and the pixels may reflect a portion of the light rays away from the pixels. For example, many optical display systems include a cover plate placed over arrays of pixels to protect the pixels from harm. However, like the surfaces of the pixels, the surface of the cover plate tends to produce stray light by reflecting some incident light rays away from the pixels. The light reflected off of the cover plate is also known as stray light and may mix with the modulated light. Consequently, conventional cover plates may degrade the contrast of display images.

One attempt to curtail the effects of stray light reflections from the surfaces of pixels and cover plates includes the use of anti-reflective coating specifications for pixel surfaces and cover plates. Anti-reflective coatings on the surfaces of pixels and cover plates are used to reduce the reflection from these surfaces. However, the residual reflections from the anti-reflection coated surfaces still reduce the contrast in modern high performance projector systems.

An approach for reducing the stray light even further includes superimposing pixel arrays one over another. However, this approach is frequently complicated and expensive to implement. Not only is the cost of parts increased, the superimposed pixel arrays must be positioned and remain in proper alignment with each other for proper operation of the display systems that make use of this approach.

SUMMARY

A light modulator device includes a top plate and an angled extender coupled to the top plate. The angled extender includes an incident portion and an exit portion that is relatively thicker than the incident portion.

BRIEF DESCRIPTION OF THE DRAWINGS

The accompanying drawings illustrate various embodiments of the present apparatus and methods and are a part of the specification. The illustrated embodiments are merely examples of the present apparatus and methods and do not limit the scope of the disclosure.

Throughout the drawings, identical reference numbers designate similar, but not necessarily identical, elements.

DETAILED DESCRIPTION

An exemplary pixel is described herein. Accordingly to several exemplary embodiments, the pixel includes an angled extender coupled to an upper surface of a pixel. The angled extender of the exemplary pixel may improve the contrast of images produced by a display system by reducing the amount of stray light contribution to the images. Stray light refers to portions of light projected from a light source that are undesirably reflected off of the surfaces of pixels and/or other components of a display system. The angled extender of the exemplary pixel may be arranged to reduce the stray light contribution to display images by reflecting a portion of the light rays from a light source away from the pixel in a manner that separates the reflected light from the modulated image-carrying light generated by the pixel. Consequently, the amount of stray light that mixes with the modulated light is reduced, and picture contrast of the display system may be improved.

In several exemplary embodiments, an angled, wedge-shaped cover plate may be positioned between a pixilated integrated circuit chip and a light source of a display system. As light from the light source strikes the surface of the cover plate, stray light reflects away from the pixels in a manner that separates the reflected light from the modulated image-carrying light produced by the pixels. Consequently, the amount of stray light that mixes with display images is reduced, and picture contrast of the display system may be improved. The cover plate may be implemented in addition to or in lieu of the angled extenders of the exemplary pixels units.

Exemplary methods of using and forming the pixels are also described herein. Arrays of exemplary pixels may be formed by attaching angled extenders to upper surfaces of the pixels of a pixilated chip using an index-matching adhesive. In one exemplary embodiment, an array of angled extenders may be produced and indexed to match an array of pixels. The array of angled extenders may be attached to the pixels using an adhesive. A laser scribe may be used to isolate the angled extenders from each other either before or after affixation to the pixels.

In the following description, for purposes of explanation, numerous specific details are set forth in order to provide a thorough understanding of the present methods and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display Systems

Figure 1:
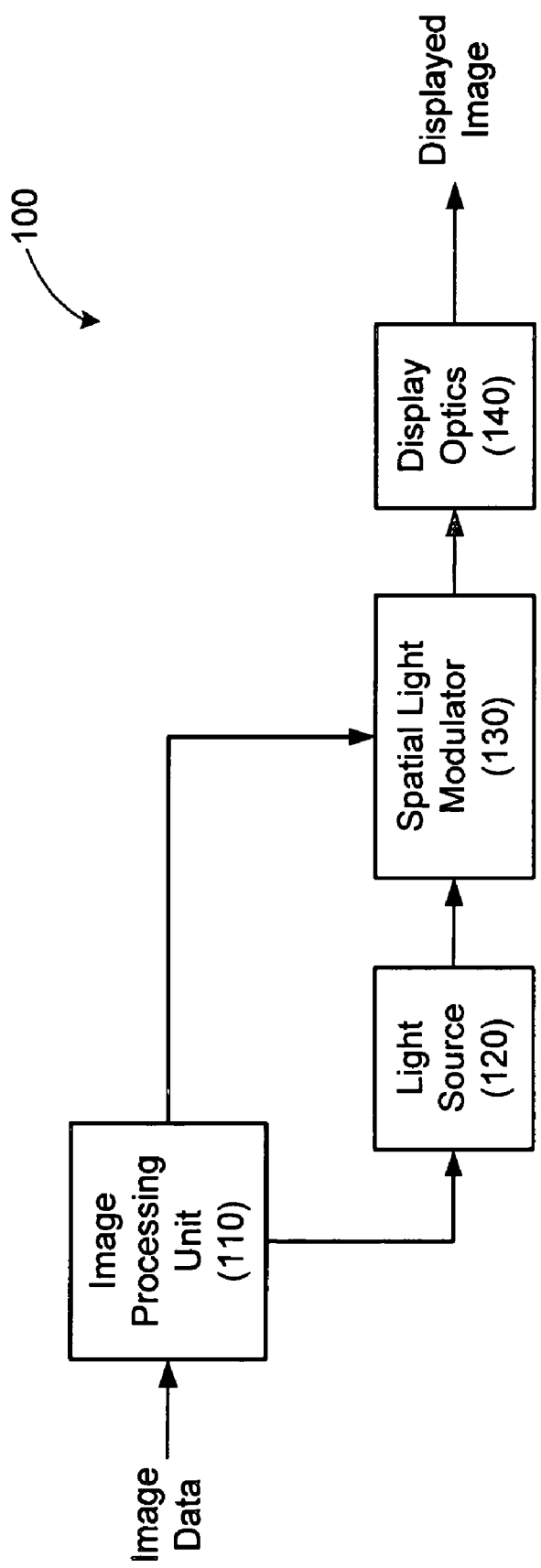
FIG. 1 illustrates a block diagram of an exemplary display system, according to one embodiment.

FIG. 1 illustrates an exemplary display system (100). The components of FIG. 1 are exemplary only and may be modified or changed as best serves a particular application. As shown in FIG. 1, image data is input into an image processing unit (110). The image data defines an image that is to be displayed by the display system (100). While one image is illustrated and described as being processed by the image processing unit (110), it will be understood by one skilled in the art that a plurality or series of images may be processed by the image processing unit (110). The image processing unit (110) may perform various functions including controlling the illumination of a light source (120) and controlling a spatial light modulator (SLM) (130). The light source (120) may project light toward the SLM (130).

The SLM (130) may include one or more arrays light modulator devices. The light modulator devices may be in the form of micro-electro mechanical (MEM) devices (not shown in FIG. 1), or pixels, which are configured to selectively modulate light and direct the modulated light toward a display (not shown), as discussed below. An angled extender may be attached to an upper surface of each pixel. As light travels from the light source (120) to a pixel, a certain amount of the light is reflected away from the pixel by the angled extender. The angled extender may be arranged so that the stray light reflected off of the surface of the angled extender is separated from the modulated light reflected by the pixel, as discussed in detail below.

The SLM (130) may include an angled, wedge-shaped cover plate to protect the pixels. Similarly to the angled extenders of the pixels, the cover plate may be positioned between the pixels and the light source (120) such that the cover plate is configured to direct some of the light reflected therefrom away from the modulated light reflected by the pixels. The cover plate may be implemented in the SLM (130) in addition to or in lieu of the angled extenders. The angled extenders and the cover plate will each be described in more detail below.

Returning to the operation of the display system (100) in general, the SLM (130) manipulates incoming light to form an image-bearing beam of light, referred to as modulated light, that is eventually displayed or cast by display optics (140) on a viewing surface (not shown). The SLM (130) includes an array of individual pixels to generate an image.

The display optics (140) may comprise any device configured to display or project an image. For example, the display optics (140) may be, but are not limited to, a lens configured to project and focus an image onto a viewing surface. The viewing surface may be, but is not limited to, a screen, television, wall, liquid crystal display (LCD), or computer monitor. The angled extenders and/or the angled cover plate discussed herein generally improve the contrast of images displayed by the display system (100) by reducing the amount of stray light that travels from the SLM (130) to the display optics (140). In other words, the angled extenders and/or the angled cover plate improve the ratio of stray light contribution from the SLM (130). The stray light ratio is defined as imaging light divided by the stray light.

Figure 2:
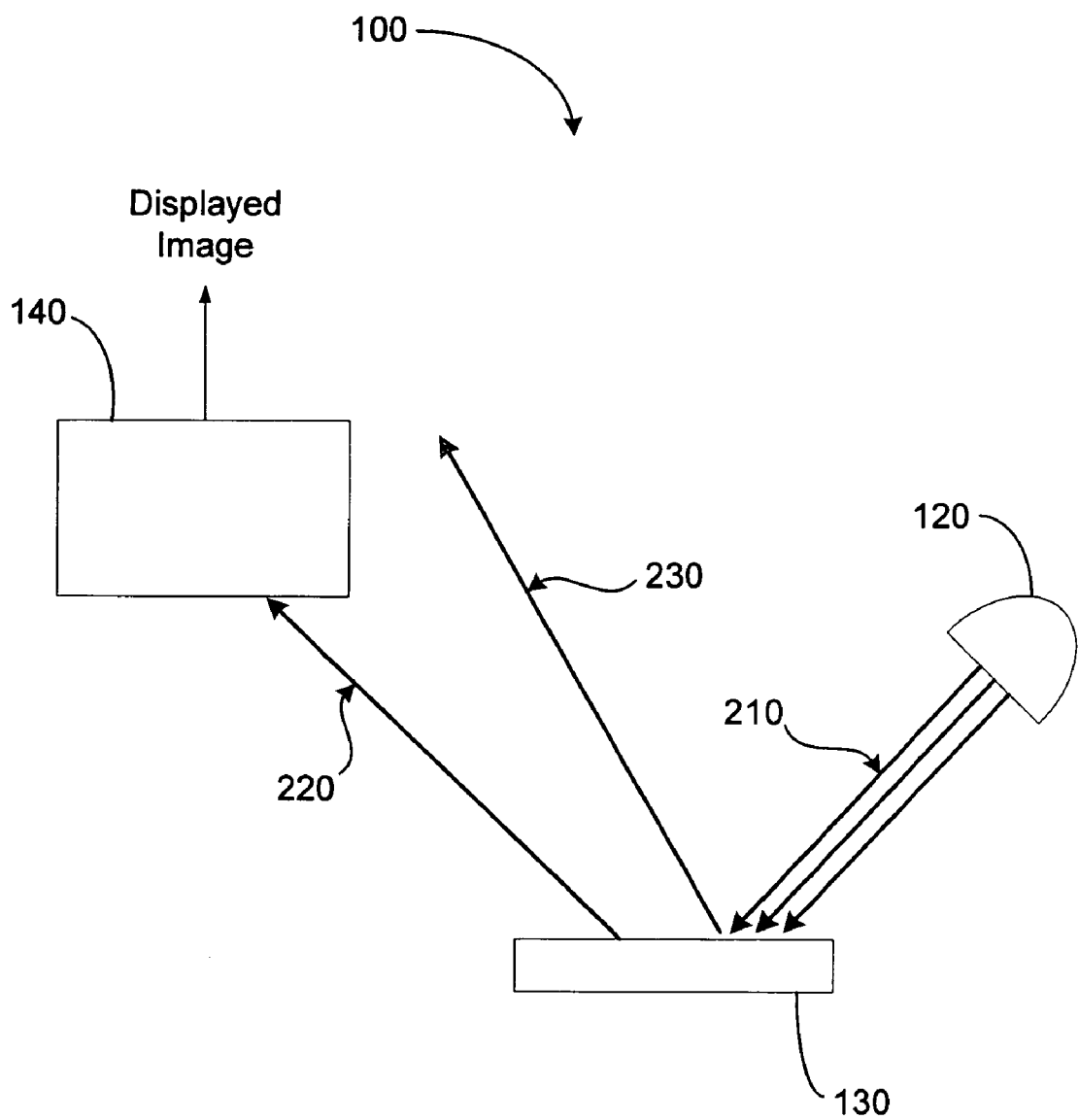
FIG. 2 illustrates a schematic view of the display system of FIG. 1, according to one embodiment.

FIG. 2 illustrates a schematic view of the display system (100) in which the light source (120) directs light rays (210) at the SLM (130). The SLM (130) reflects an image-bearing beam of light referred to as modulated light (220) toward the display optics (140). As shown in FIG. 2, the SLM (130) also reflects stray light (230) generally in a direction that prevents the stray light (230) from intersecting the display optics (140). As a result, the amount of stray light (230) that mixes with the modulated light (220) is minimized, thereby improving the contrast of the displayed image.

Angled Pixel Extender

Figure 3A:
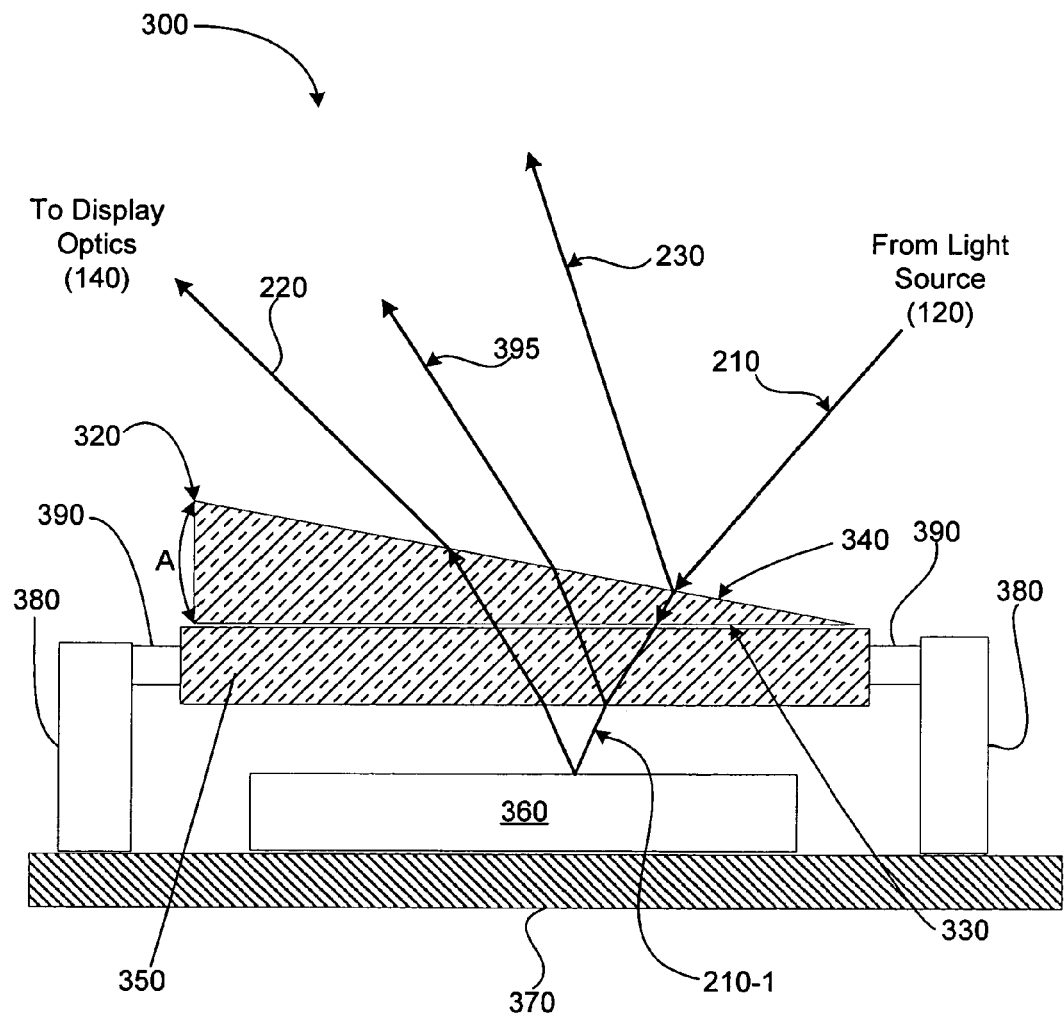
FIG. 3A illustrates a section view of an exemplary pixel having an angled extender, according to one embodiment.

The SLM (130) of FIG. 1 may be equipped with pixels configured to reduce the stray light contribution to the modulated light (220) by separating the stray light (230) from the modulated light (220). FIG. 3A illustrates an exemplary pixel (300) that includes an angled extender (320) attached thereto. The pixel (300) of FIG. 3A is representative of a single pixel that may be arranged to form one or more pixel arrays. The pixel array(s) may be included as part of one or more integrated circuit chips that form a part of the SLM (FIG. 1; 130) of the display system (FIG. 1; 100).

The angled extender (320) may comprise any transparent or semi-transparent material suitable for allowing enough light from the light source (FIG. 1; 120) to pass through the angled extender (320) and reach the pixel (300). Enough light refers to any amount greater than or equal to a minimum amount of light that will allow the display system (FIG. 1; 100) to generate displayed images of acceptable quality. The angled extender (320) may comprise but is not limited to transparent or semi-transparent compositions of glass, plastic, and resin. The angled extender (320) may include coatings designed to manipulate its reflective and/or refractive properties. In an exemplary embodiment, the angled extender (320) is in the form of a glass, wedge-shaped prism. The angled extender (320) may be sized to approximately cover the top surface of the pixel plate (350).

As shown in FIG. 3A, the angled extender (320) has a top surface (340) oriented, at a particular angle (A), toward the light source (FIG. 1; 120). The angle (A) is a measure of the angle of the top surface (340) with respect to the upper surface (330) of the pixel (300). With the top surface (340) of the angled extender (320) angled toward the light source (FIG. 1; 120), the pixel (300) is configured to reflect stray light at a direction that generally will not intersect the display optics (FIG. 1; 140). In several exemplary embodiments, it is preferable for the angle (A) to be greater than about two degrees. Further, it may be desirable that the angle (A) be at least ten degrees (10°) with respect to the upper surface (330) of the pixel (300). According to the present exemplary embodiment the pixel (300) also includes a pixel plate (350) with a semi-reflective coating and a fixed, highly reflective bottom electrode plate (360), which rests on a substrate (370). The pixel plate (350) is supported above the electrode plate (360) by posts (380) and flexures (390).

In FIG. 3A, light rays (210) from the light source (FIG. 1; 120) travel to the pixel (300). As the light rays (210) reach the top surface (340) of the angled extender (320), a certain amount of the light rays (210) reflects off of the top surface (340) and travels, as stray light (230), away from the pixel (300), as generally shown in FIG. 3A Because of the angled top surface (340) of the angled extender (320), the stray light (230) is separated from the modulated light (220) such that the angled extender (320) minimizes the stray light (230) that mixes with the modulated light (220).

The transmitted light rays (210-1) travel through the angled extender (320) until reaching the top side of the pixel plate (350). At this interface, a small portion of the light incident on the pixel plate (350) will be reflected. The amount of light may be minimized by reducing a difference between the index of refraction of the angled extender (320) and the pixel plate (350) by using index-matching adhesives. As the light rays (210) travel through the pixel plate (350), they are incident on the underside of the pixel plate (350), which may be coated with a semi-reflective coating. An intermediate portion (395) of the transmitted light (210-1) is then reflected back through the pixel plate (350) and angled extender (320) and away from the display optics (140).

The non-reflected, or transmitted light (210-1) passes through the pixel plate (350) and the reflective coating and into the optical gap between the pixel plate (350) and the electrode plate (360). Once the light enters the optical gap, it is bounced between the partially reflective coating on the pixel plate (350) and the highly reflective coating on the electrode plate (360). Each time the light inside the optical gap becomes incident on the reflective coating on the underside of the pixel plate (350), a portion of modulated light (220) passes through the partially reflective coating and pixel plate (350), through the angled extender (320), and escapes the pixel (300). The wavelength of the modulated light (220) that is thus able to escape depends, at least in part, on the size of the optical gap, Accordingly, varying the size of the optical gap controls the characteristics of light that exits the pixel (300).

The angled extender (320) separates the modulated light (220) from the reflected light (230, 395). In particular, the exiting modulated light (220) travels through a section of the angled extender (320) that is thicker than the section of the angled extender (320) passed through by the entering light rays (210-1). As the modulated light (220) exits from the angled extender (320), the modulated light (220) refracts farther away from the path of the stray light (230), thereby further separating the stray light (230) from the modulated light (220).

Figure 3B:
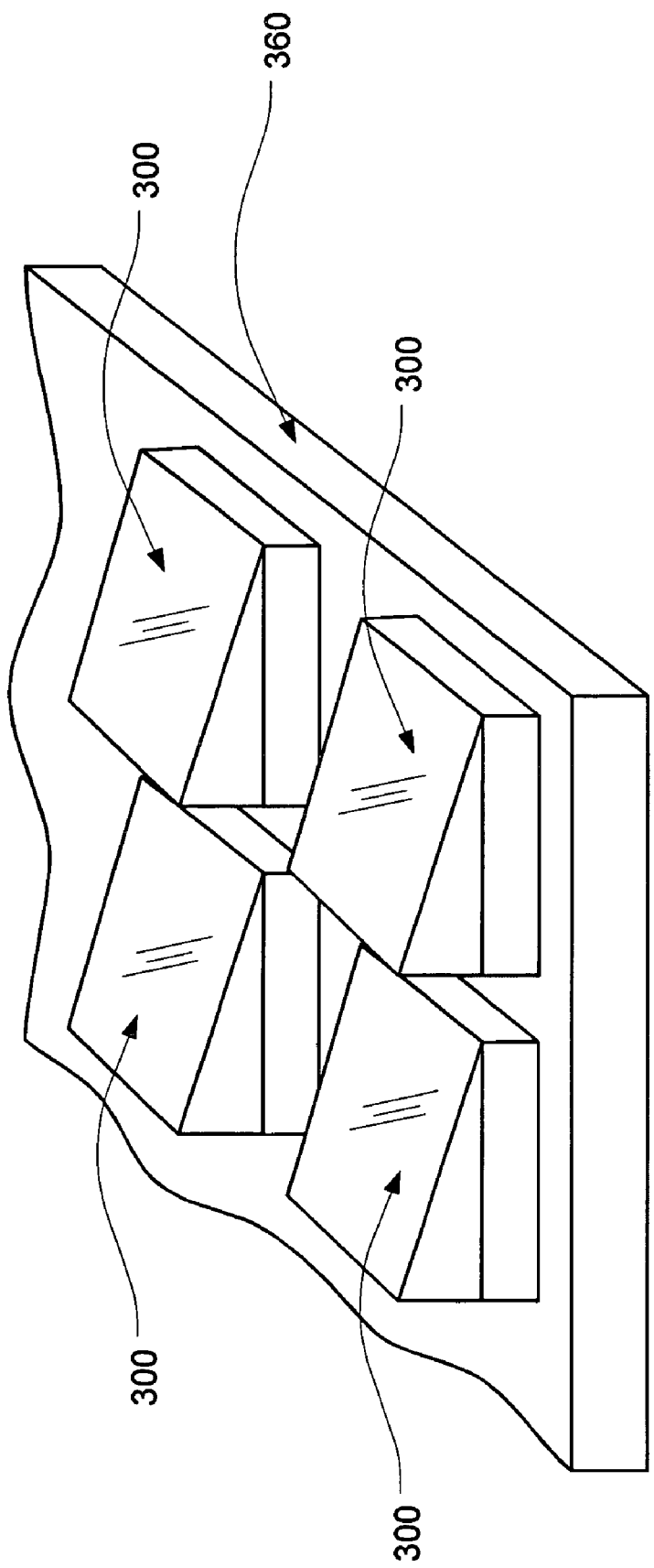
FIG. 3B illustrates a perspective view of multiple exemplary pixels of FIG. 3A arranged on an integrated circuit chip, according to one embodiment.
Figure 4:
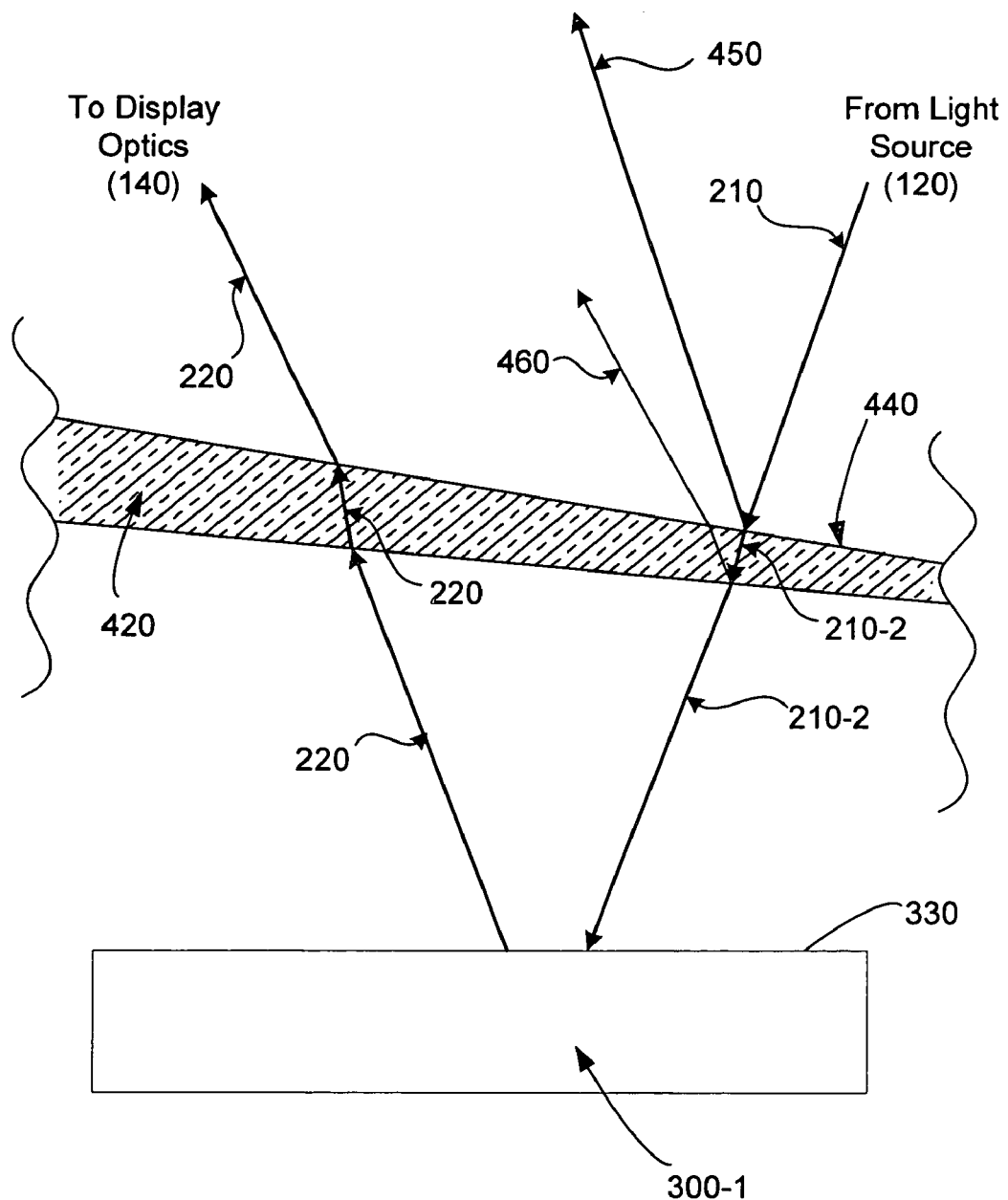
FIG. 4 illustrates a section view of an exemplary cover plate positioned over a pixel, according to one embodiment.

When multiple pixels (300) are arranged to form an array, each pixel (300) may function to increase the separation between the modulated light (220) and the stray light (230) as discusses above. FIG. 3B illustrates a perspective view of multiple exemplary pixels (300) arranged on an integrated circuit chip (360). As shown in FIG. 4, the pixels (300) may be arranged to form arrays of different sizes and shapes for different sizes and shapes of integrated circuit chips (360).

Angled Cover Plate

The contrast ratio of displayed images may also be improved by implementing a cover plate designed to separate reflected stray light from the modulated light (220). For example, FIG. 4 illustrates an angled, wedge-shaped cover plate (420) that may be positioned between the light source (FIG. 1; 120) and a particular pixel (300-1). Like the angled extender (320), the cover plate (420) may comprise any transparent or semi-transparent material suitable for allowing enough light from the light source (FIG. 1; 120) to pass through the cover plate (420) and reach the pixel (300). Again, enough light refers to any amount greater than or equal to a minimum amount of light that will allow the display system (FIG. 1; 100) to generate displayed images of acceptable quality. The cover plate (420) may include but is not limited to transparent or semi-transparent compositions of glass, plastic, and resin. In an exemplary embodiment, the cover plate (420) is made substantially of a glass composition.

As shown in FIG. 4, the cover plate (420) has a top surface (440) angled toward the light source (FIG. 1; 120). In such an angled position, the cover plate (420) is configured to reflect stray light (450) away from the display optics (FIG. 1; 140). When light rays (210) reach the top surface (440) of the cover plate (420), a certain amount of the light rays (210), referred to as the stray light (450), is reflected off of the surface (440) and away from the pixel (300-1).

The transmitted light rays (210-2) travel through the cover plate (420). Another portion of light (460) is reflected from the second surface of the cover plate (420) while the rest is transmitted light rays (210-2) that are directed to the pixel (300-1). The pixel (300-1) then modulates and manipulates the light rays (210-2) to generate the modulated light (220), as discussed above. While a Fabry-Perot type pixel is discussed herein, those of skill in the art will appreciate that the cover plate (420) may also be used with any type of pixel array. Accordingly, for ease of reference, the pixel (300-1) is illustrated schematically in FIG. 4.

The modulated light (220) is directed from the pixel (300-1) through the cover plate (420) and toward the display optics (FIG. 1; 140). The stray light (450) is reflected along a path that generally diverges from the path of the modulated light (220). Consequently, the stray light (450) is generally prevented from mixing with the modulated light (220).

As shown in FIG. 4, the cover plate (420) may be in the shape of a wedge with the thinner end of the wedge near the light source (FIG. 1; 120). With the thinner end of the cover plate (420) positioned near the light source (FIG. 1; 120), the cover plate (420) is configured to refract light in a manner that further separates the stray light (450) from the modulated light (220). The light rays (210) from the light source (FIG. 1; 120) refract, as designated by the light rays (210-2), upon entry into the cover plate (420). In addition, the modulated light (220) exits the pixel (300-1) and travels through the cover plate (420).

Because the cover plate (420) is wedge-shaped, the exiting modulated light (220) travels through a section of the cover plate (420) that is thicker than the section of the cover plate (420) passed through by the entering light rays (210-2). As the modulated light (220) exits from the cover plate (420), the modulated light (220) refracts farther away from the path of the stray light (450), thereby further separating the stray light (450) from the modulated light (220).

The cover plate (420) may extend to cover multiple pixels (300) arranged in one or more pixel arrays. In an exemplary embodiment, the cover plate (420) is arranged to cover the pixels (300) of a pixilated integrated circuit chip.

Combination of Angled Extenders and Cover Plate

Figure 5:
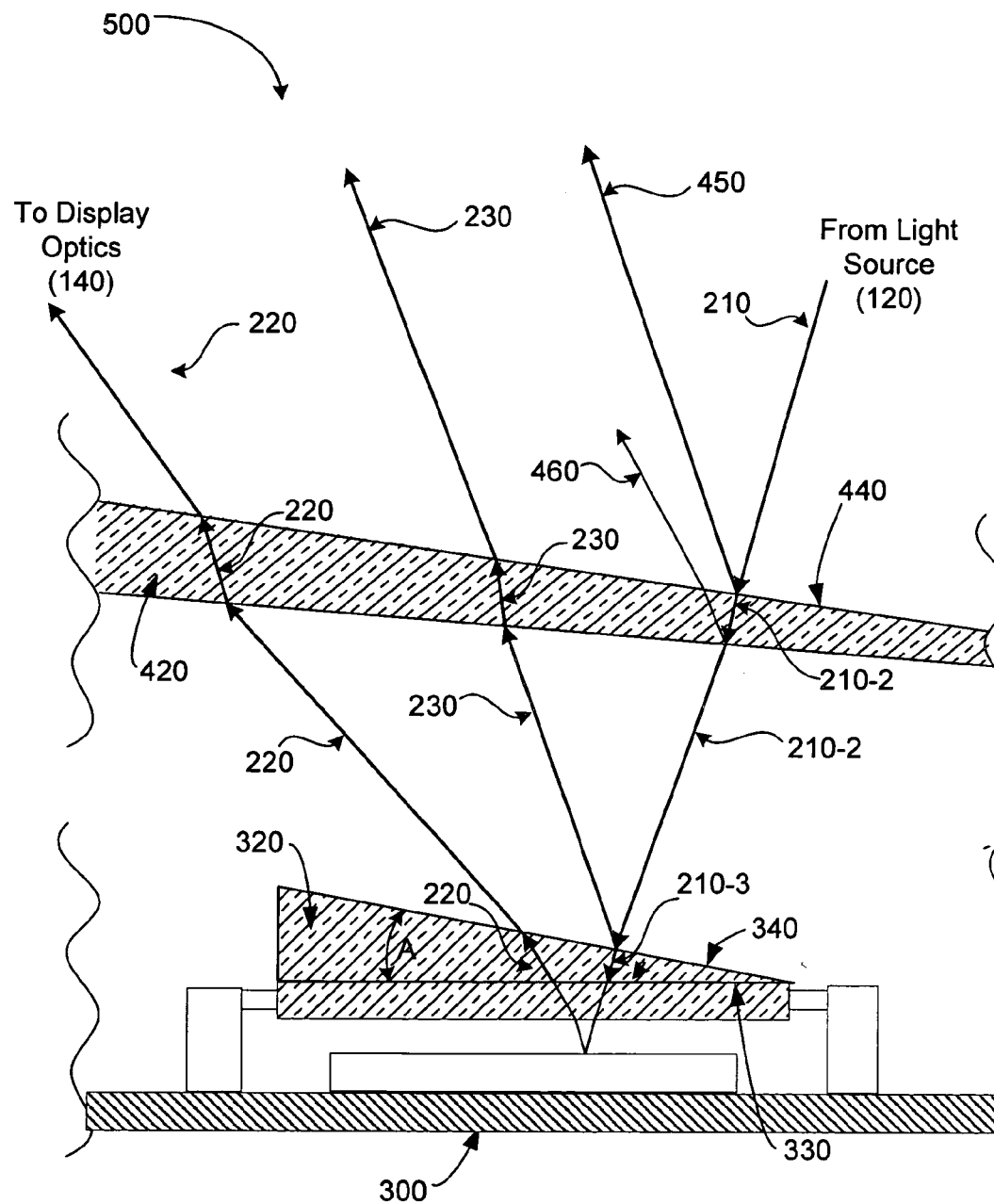
FIG. 5 illustrates a section view of an exemplary segment of an array of the exemplary pixels of FIG. 3A covered by the cover plate of FIG. 4, according to one embodiment.

In several exemplary embodiments, the angled extenders (FIG. 3A; 320) and the cover plate (FIG. 4; 420) may be used together to cooperatively increase the separation between paths of the modulated light (FIG. 2; 220) and paths of the stray light (FIG. 2; 230 and FIG. 4; 450). FIG. 5 illustrates an exemplary segment (500) of an array of the pixels (300) covered by the cover plate (420). The pixels (300) and the cover plate (420) may be configured as described above.

As light rays (210) from the light source (FIG. 1; 120) reach the top surface (440) of the cover plate (420), stray light (450) reflects off of the surface (440). As shown in FIG. 5, the stray light (450) is reflected generally away from the display optics (FIG. 1; 140).

The remainder of the light rays (210-2) travel through the cover plate (420) and toward the pixel (300). As the remaining light rays (210-2) reach the top surface (340) of the angled extender (320), stray light (230) reflects off of the top surface (340) and travels away from the pixel (300). As shown in FIG. 5, the stray light (230) travels through the cover plate (420), emerging from the top surface (440) of the cover plate (420) to travel generally along a path that does not intersect the display optics (FIG. 1; 140). In this manner, the stray light (230) reflected form the surface (340) of the angled extender (320) is prevented from mixing with the modulated light (220).

The remainder of the light rays (210-3) not reflected off of the surface (340) of the angled extender (320) travel through the angled extender (320) until reaching the pixel (300). The light rays (210-3) are then modulated and manipulated within the pixel (300) to generate the modulated light (220). The modulated light (220) exits the pixel (300), travels through the angled extender (320), and toward the cover plate (420) as shown in FIG. 5. The modulated light (220) then travels through the cover plate (420), emerging from the top surface (440) of the cover plate (420) to travel generally along a path that generally intersects the display optics (FIG. 1; 140).

Thus, the respective angled surfaces (340 and 440) of the angled extender (320) and the cover plate (420) direct the reflected stray light (230 and 450) away from the display optics (FIG. 1; 140), thereby reducing the amount of stray light that might be mixed with the modulated light (220) at the display optics (FIG. 1; 140).

The modulated light (220) may be further separated from the reflected stray light (230 and 450) by the respective wedge-shapes of the angled extender (320) and the cover plate (420). The modulated light (220) travels through segments of the angled extender (320) and the cover plate (420) that are relatively thicker than the segments of the angled extender (320) and the cover plate (420) through which the reflected stray light (230 and 450) pass. As a result, the modulated light (220) is generally refracted farther away from the paths of the stray light (230 and 450), as shown in FIG. 5. With the increased separation between the paths of the reflected stray light (230 and 450) and the modulated light (220), the amount of stray light mixed with the modulated light (220) is reduced, and image contrast is consequently improved.

Method of Reducing Stray Light Contribution

Figure 6:
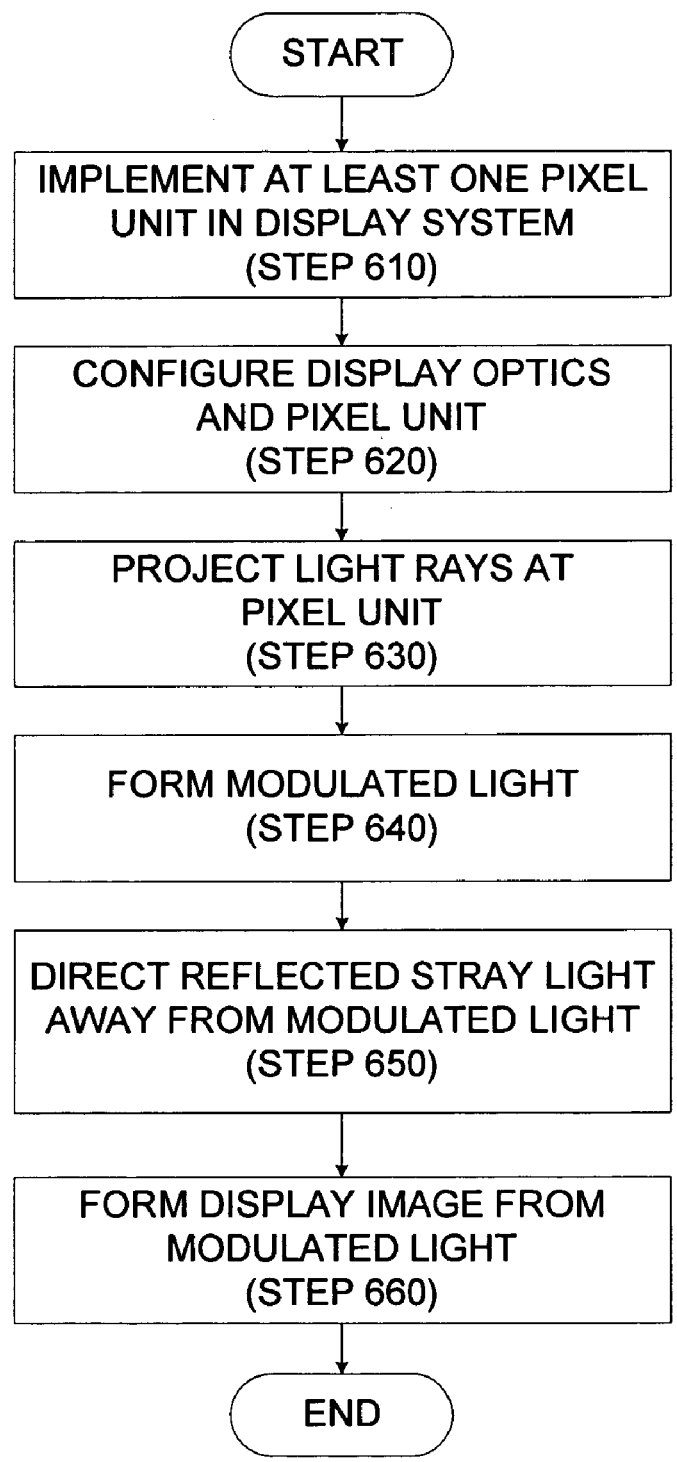
FIG. 6 is a flowchart illustrating an exemplary method of reducing stray light contribution to modulated light in the display system of FIG. 1, according to one embodiment.

FIG. 6 is a flowchart illustrating an exemplary method of reducing stray light contribution to the modulated light (FIG. 2; 220) in the display system (FIG. 1; 100). While FIG. 6 shows a number of steps of an exemplary method, in other embodiments, some of the steps may be omitted, additional steps may be performed, and/or the steps may be performed in a different order than shown.

The method begins by implementing at least one pixel (step 610) in the display system (FIG. 1; 100). In particular, one or more arrays of the exemplary pixels (FIG. 3A; 300) may be implemented in the SLM (FIG. 1; 130) of the display system (FIG. 1; 100). The pixel arrays may be included as part of one or more integrated circuits, such as the pixel (FIG. 3A; 300) arranged on the integrated circuit (FIG. 3B; 360) of FIG. 3B. An exemplary method of forming arrays of exemplary pixels (FIG. 3A; 300) is discussed in detail below.

The pixels (FIG. 3A; 300) and the display optics (FIG. 1; 140) of the display system (FIG. 1; 100) may be configured (step 620) so that the pixels (FIG. 3A; 300) are arranged to direct modulated light (FIG. 2; 220) to the display optics (FIG. 1; 140). This may involve aligning an array of the pixels (FIG. 3A; 300) with the display optics (FIG. 1; 140), and taking into account the light refractions introduced by the wedge shape of the angled extender (FIG. 3A; 320) of the exemplary pixel (FIG. 3A; 300). In several exemplary embodiments, the configuration (step 620) may involve taking into account the light refractions introduced by the wedge shape of the cover plate (420; FIG. 4).

Light rays (FIG. 2; 210) may be projected at the implemented pixel (FIG. 3A; 300) (step 630). The light source (FIG. 1; 120) is configured to project the light rays (FIG. 2; 210). Modulated light (FIG. 2; 220) may be formed from the projected light rays (FIG. 2; 210) (step 640). The pixels (FIG. 3A; 300) of the exemplary pixels (FIG. 3A; 300) may modulate the light rays (FIG. 2; 210) as discussed above. The modulated light (FIG. 2; 220) is reflected from the pixels (FIG. 3A; 300) and directed toward the display optics (FIG. 1; 140).

Reflected stray light (FIG. 3A; 330 and FIG. 4; 450) is directed away from the modulated light (FIG. 2; 220) (step 650). As discussed above, the angled orientation of the angled extender (FIG. 3A; 320) and/or the angled orientation of the cover plate (FIG. 4; 420) reflect the stray light (FIG. 3A; 330 and FIG. 4; 450) along paths that generally diverge from the modulated light (FIG. 2; 220) and generally prevent the reflected stray light (FIG. 3A; 330 and FIG. 4; 450) from intersecting the display optics (FIG. 1; 140).

One or more display images may be formed from the modulated light (FIG. 2; 220) (step 660). The display optics (FIG. 1; 140) may prepare the modulated light (FIG. 2; 220) for display as discusses above. The contrast of the display images is improved because the stray light (FIG. 3A; 330 and FIG. 4; 450) generally does not mix with the modulated light (FIG. 2; 220).

Method of Forming Arrays of Exemplary Pixels

Figure 7:
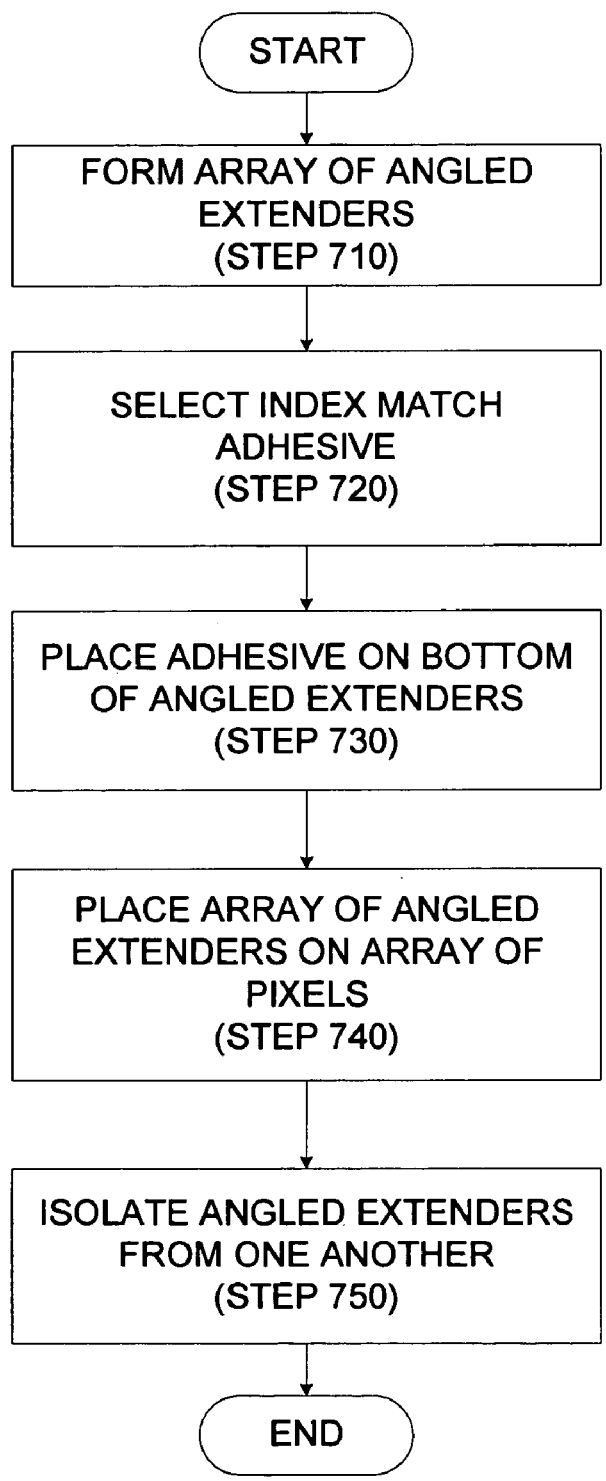
FIG. 7 is a flowchart illustrating an exemplary method of forming an array of exemplary pixels having the angled extenders of FIG. 3A, according to one embodiment.

FIG. 7 is a flowchart illustrating an exemplary method of forming an array of exemplary pixels (FIG. 3A; 300) having angled extenders (FIG. 3A; 320), according to one embodiment. While FIG. 7 shows a number of steps of an exemplary method, in other embodiments, some of the steps may be omitted, additional steps may be performed, and/or the steps may be performed in a different order than shown.

The method begins by forming an array of angled extenders (FIG. 3A; 320) (step 710). The array may be of any size or shape and may include one or more angled extenders (FIG. 3A; 320). For example, the array may comprise a linear row or multiple rows of angled extenders (FIG. 3A; 320). The size and shape of the array may be determined based on a particular application or integrated circuit chip design. The array of angled extenders (FIG. 3A; 320) may be produced using a sol-gel process commonly used in creating glass and ceramic materials for diffractive optics testbeds.

The array of angled extenders (FIG. 3A; 320) may be index matched to an array of pixels (FIG. 3A; 300) by selecting an index matching fluid or adhesive (step 720). Index matching refers to using an index matching fluid or adhesive to bond the angled extenders (FIG. 3A; 320).

The array of angled extenders (FIG. 3A; 320) may be placed on the array of pixels (FIG. 3A; 300) such that the adhesive physically couples the arrays together (step 740). A precision robotic mechanism may be used to place the array of angled extenders (FIG. 3A; 320) on the pixels (FIG. 3A; 300).

In some embodiments, steps 710 through 740 may be repeated to place additional arrays of angled extenders (FIG. 3A; 320) on arrays of pixels (FIG. 3A; 300). For example, multiple arrays of angled extenders (FIG. 3A; 320) in the form of individual rows may be placed row-by-row on an integrated circuit of pixels (FIG. 3A; 300) by repeating steps 710 through 740 for each row. Other sizes and shapes of arrays of angled extenders (FIG. 3A; 320) may be iteratively or non-iteratively places on array of pixels (FIG. 3A; 300).

Either before or after the array of angled extenders (FIG. 3A; 320) is placed on the array of pixels (FIG. 3A; 300). If desired, the angle extenders (FIG. 3A; 320) may be isolated from one another (step 750). In one embodiment, a laser scribe is used to isolate the angled extenders (FIG. 3A; 320) from one another. In another embodiment, a pattern of laser beams is lithographically exposed by creating a mask and imaging the mask on an integrated circuit chip to break the connections between the angled extenders (FIG. 3A; 320). The exemplary method of FIG. 7 may be performed either at manufacture of components of the display system (FIG. 1; 100) or at a modification event subsequent to manufacture.

In conclusion, an exemplary pixel including a pixel and an angled extender is provided. The angled extender of the exemplary pixel may improve the contrast of images produced by a display system by reducing the amount of stray light that mixes with modulated image-carrying light. An angled surface of the angled extender reflects a portion of light rays from a light source at an angle that helps to separate the reflected stray light from the modulated light reflected by the pixel. Consequently, the amount of stray light that mixes with the modulated light is reduced, and picture contrast of the display system may be improved.

In several exemplary embodiments, an angled, wedge-shaped cover plate may be positioned between an integrated circuit of pixels and a light source. As light from the light source strikes the surface of the cover plate, stray light reflects from the surface at angles that move the stray light away from the modulated light reflected by the pixels. Consequently, the amount of stray light that mixes with the modulated light is reduced by the angled, wedge-shaped cover plate, and picture contrast of the display system may be improved. The cover plate may be implemented with or without the angled extenders of the pixels.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A projector assembly, comprising:
a spatial light modulator;
a light source configured to direct light to said spatial light modulator;
display optics configured to receive a spatially modulated light beam from said light modulator; and
a plurality of angled extenders, each angled extender being coupled to a pixel of said spatial light modulator, each of said angled extenders including a first surface; and a second surface, said second surface being configured to be placed in optical communication with at least one pixel and being disposed at an angle relative to said first surface, wherein said angled extenders are configured such that light from said light source reflected by said first surface is reflected away from said display optics, but light modulated by a pixel is directed by a said angled extender to said display optics.

2. The angled extender of claim 1, wherein at least one of said angled extenders has an angle of at least two degrees defined between said first surface and said second surface.

3. The angled extender of claim 1, wherein each of said angled extenders is wedge shaped.

4. The angled extender of claim 1, wherein each of said angled extenders are arranged such that an thinnest end of said angled extender is most proximate said light source.

5. The assembly of claim 1, wherein said angle is from 2 to 10 degrees.

6. The assembly of claim 1, further comprising a separate angled extender corresponding and coupled to each said pixel of said spatial light modulator.

7. The assembly of claim 1, further comprising a cover plate covering said spatial light modulator and said plurality of angled extenders, wherein said cover plate is also configured such that light from said light source reflected by a first surface of said cover plate is reflected away from said display optics, but light passing through said cover plate which is then modulated by a pixel is directed by a said cover plate to said display optics.

8. The assembly of claim 1, wherein said angled extenders each comprise a prism.

9. The assembly of claim 1, wherein said angled extenders are coupled to said pixels using an adhesive that matches an index of refraction of said angled extender with an index of refraction of a pixel plate of a said pixel.

10. The assembly of claim 1, wherein each said pixel is configured to use internal reflection to produce light of a specific color.

11. A projector assembly, comprising:
a spatial light modulator having a plurality of pixels;
a light source in optical communication with said pixels;
display optics configured to receive a spatially modulated light beam from said light modulator; and
an angled extender having a first surface and a second surface, said second surface being configured to be placed in optical communication with said pixels and being disposed at an angle relative to said first surface, wherein said angled extender comprises a cover plate covering said spatial light modulator, wherein said cover plate is configured such that light from said light source reflected by a first surface of said cover plate is reflected away from said display optics, but light passing through said cover plate which is then modulated by a pixel is directed by a said cover plate to said display optics.

12. The assembly of claim 11, further comprising a plurality of additional angled extenders disposed between said cover plate and said pixels of said spatial light modulator, wherein said plurality of additional angled extenders are placed in optical communication with said plurality of pixel, wherein said angled extenders are each configured such that light from said light source reflected by an upper surface of an angled extender is reflected away from said display optics, but light modulated by a pixel is directed by a said angled extender to said display optics.

13. The assembly of claim 12, wherein each of said plurality of additional angled extender comprises a prism.

14. The assembly of claim 11, wherein each said angled extender corresponds to and is coupled to one of said plurality of pixels.

15. The assembly of claim 11, wherein said plurality of pixels comprise Fabry-Perot type pixels.

16. The assembly of claim 11, wherein said plurality of pixels comprise reflective type pixels.

17. The assembly of claim 11, wherein said angle is from 2 to 10 degrees.

18. The assembly of claim 11, wherein said angled extenders are coupled to said pixels using an adhesive that matches an index of refraction of said angled extender with an index of refraction of a pixel plate of a said pixel.

19. The assembly of claim 11, wherein said cover plate coupled to said pixels using an adhesive that matches an index of refraction of said cover plate with an index of refraction of a pixel plate of a said pixel.

20. The assembly of claim 11, wherein said cover plate has a wedge shape.

21. The assembly of claim 11, wherein said cover plate is arranged such that a thinnest edge of said cover plate is arranged most proximate to said light source.

22. The assembly of claim 11, wherein each said pixel is configured to use internal reflection to produce light of a specific color.

* * * * *